No. 715,609. Patented Dec. 9, 1902.
A. N. ROSE.
WATER COOLER.
(Application filed Mar. 26, 1902.)
(No Model.)
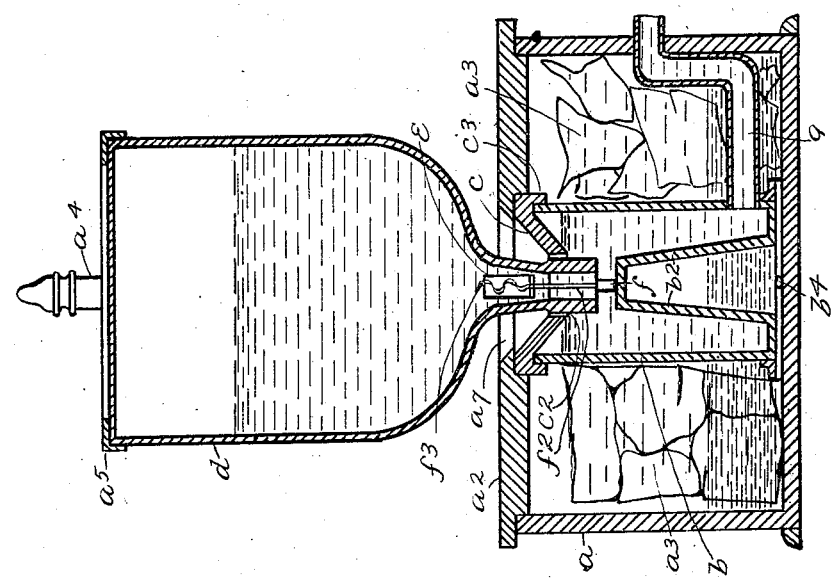
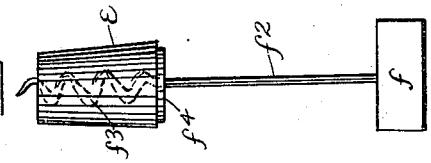
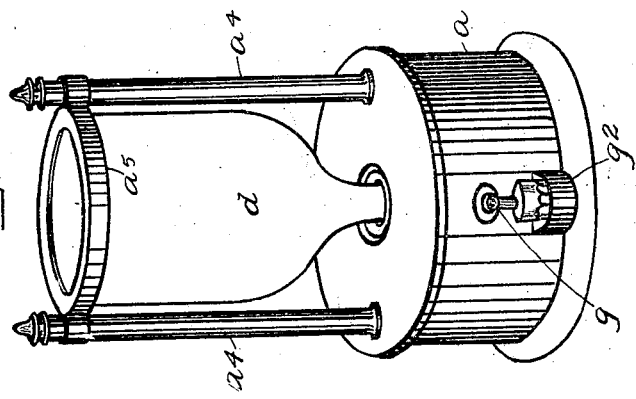
WITNESSES
INVENTOR
Alonzo N. Rose
BY
Edgar Tate & Co
ATTORNEYS

UNITED STATES PATENT OFFICE.

ALONZO N. ROSE, OF NEW YORK, N. Y.

WATER-COOLER.

SPECIFICATION forming part of Letters Patent No. 715,609, dated December 9, 1902.

Application filed March 26, 1902. Serial No. 99,997. (No model.)

*To all whom it may concern:*

Be it known that I, ALONZO N. ROSE, a citizen of the United States, residing at New York, in the county of New York and State of New York, have invented certain new and useful Improvements in Water-Coolers, of which the following is a full and complete specification, such as will enable those skilled in the art to which it appertains to make and use the same.

The object of this invention is to provide a water-cooler designed for use in connection with demijohns or large bottles containing water which it is designed to cool for drinking purposes; and with this and other objects in view the invention consists in a device of the class specified constructed as hereinafter described and claimed.

The invention is fully disclosed in the following specification, of which the accompanying drawings form a part, in which the separate parts of my improvement are designated by the same reference characters in each of the views, and in which—

Figure 1 is a perspective view of my improved water-cooler; Fig. 2, a sectional side elevation thereof, and Fig. 3 a side elevation of a bottle cork or stopper which I employ.

In the practice of my invention I provide a base-receptacle $a$, which is preferably cylindrical in form in cross-section, and said receptacle is provided with a cover $a^2$, which may be secured thereto or connected therewith in any desired manner; but in practice this connection between the cover $a^2$ and the base-receptacle $a$ is such that said cover may be raised or opened in the operation of placing ice in the base-receptacle, the ice being indicated at $a^3$ in Fig. 2.

Within the receptacle $a$ and centrally thereof is placed a supplemental casing or receptacle $b$, the bottom portion of which is provided with an upwardly-directed member $b^2$, which extends to within a predetermined distance from the top of said receptacle $b$ and around which the water is free to circulate in said receptacle, and said member $b^2$ is open at the bottom, and the receptacle $b$ is provided at the bottom with radial passages $b^4$, whereby the water in the base-receptacle $a$ is free to circulate beneath the bottom of the receptacle $b$ and rise in the central portion thereof formed by the part $b^2$.

The cover $a^2$ is provided with standards $a^4$, on which is mounted a vertically-movable ring $a^5$, which is L-shaped in cross-section, and said cover is also provided with a central opening $a^6$, beneath which is placed a cover $c$ of the central receptacle $b$.

The body portion of the cover $c$ of the receptacle $b$ is conical in form, and the apex thereof is directed downwardly and provided with a central opening $c^2$, and said cover is also provided with an annular flange or rim $c^3$, by which it is held in place on the receptacle $b$, and the central opening $c^2$ therein is directly over the top of the raised part or member $b^2$ on the bottom of the receptacle $b$.

My improved cooler is designed for the purpose of cooling water contained in demijohns or large bottles, one of which is shown at $d$ in Figs. 1 and 2, and in practice I employ a stopper for a demijohn or bottle which is of the usual form, as shown at $e$; but in connection with this stopper I employ an ordinary corkscrew or similar device consisting of a handle portion $f$ and a shank $f^2$, connected therewith, said shank being provided with the usual spiral end member $f^3$. In practice the neck of a demijohn or bottle is closed by the cork $e$ in the usual manner, and whenever it is desired to cool the water in said demijohn or bottle as drinking-water the ring or band $a^5$ is raised on the standards $a^4$ and the demijohn or bottle is placed in the position shown in Figs. 1 and 2, in which operation the handle $f$ of the corkscrew attachment with which the cork $e$ is provided passes downwardly through the cover $c$ of the supplemental or inner casing $b$ and strikes the top of the central raised portion $b^2$ of the bottom thereof, and the cork is forced upwardly into the neck of the bottle or demijohn, as shown in Fig. 2, and in this same operation the ring or band $a^5$ is lowered, so that it rests on the inverted upper end of the bottle or demijohn and holds the same in an upright position. When the parts are in the position shown in Fig. 2 and the cork $e$ has been forced inwardly into the bottle or demijohn, the water will flow out into the central or inner casing $b$ and rise therein up to the point indicated in Fig. 2 or above the opening in the cover $c$ of the central casing $b$.

It will be understood that the base-casing $a$ is filled with ice, as indicated in Fig. 2 and as hereinbefore described, and the central casing or receptacle $b$ is provided at one side and near the bottom thereof with a draw-off pipe $g$, which extends outwardly through the side of the base-casing $a$ and which is provided with a faucet or similar device in the usual manner, and said base-casing is also preferably provided with a glass or cup holder $g^2$.

My invention is not limited in any way to the corkscrew attachment of the cork $e$, and any suitable means or devices may be provided in connection with said cork which will operate in the same manner, the only object in this connection being to provide suitable means or devices in connection with the cork whereby when the demijohn or bottle is inverted and placed in the position shown in Fig. 2 the said means or devices will operate, in connection with the central raised portion $b^2$ of the inner casing $b$, to force the stopper upwardly or into the demijohn-bottle.

It will be understood, of course, that the water cannot rise in the inner casing $b$ higher than indicated in Fig. 2 by reason of the fact that the air-exhaust is closed, and it will also be understood that the corkscrew may be connected with stopper $e$ at any time, and by preference this is preferably done just before the bottle is placed in position on the base of the cooler, and the shank $f^2$ of the corkscrew is preferably provided with a disk or plate $f^4$, and when the corkscrew is screwed into the cork and placed in the position shown in Fig. 2 the handle of the corkscrew strikes the central raised portion $d^2$ of the casing $d$, as hereinbefore described, and the weight of the demijohn rests on the handle $f$ of the corkscrew, which in turn rests on the central portion $d^2$ of the casing $b$, and the water is free to flow out through the neck of the demijohn at the opposite sides of the handle of the corkscrew.

This device is simple in construction and operation and perfectly adapted to accomplish the result for which it is intended and may be used wherever devices of this class are required, and changes in and modifications of the construction described may be made without departing from the spirit of my invention or sacrificing its advantages.

Having fully described my invention, what I claim as new, and desire to secure by Letters Patent, is—

1. A water-cooler designed for use in connection with demijohns or large bottles containing water, comprising a base-casing provided with a top member having a central opening and vertically-arranged standards, means connected with said standards for holding a bottle or demijohn in an upright position, a central casing arranged within the base-casing, and provided with a conical cover, the apex of which is directed downwardly and directly under the opening in the top member of the base-casing, said cover of the central casing being provided with a central opening and the bottom of said central casing with a central raised portion, and the side thereof near the bottom thereof with a pipe which leads outwardly through the base-casing, substantially as shown and described.

2. A water-cooler comprising a base-casing having a top provided with a central opening and means for holding a demijohn in an upright position, a central casing within the base-casing and provided with a cover which is conical in form and the apex of which is directed downwardly and provided with a central opening directly under the opening in the top of the base-casing, said central opening being adapted to receive the neck of a demijohn and the bottom of the central casing being also provided with an upwardly-directed member and the demijohn with a stopper provided with a device which strikes said raised portion when the demijohn is inverted and the neck thereof passes downwardly through the opening in the cover of the base-casing and through the cover of the central casing, substantially as shown and described.

3. In a water-cooler, a base-casing provided with a cover having a central opening, an inner central supplemental casing provided with a conical cover, the apex of which is open and directed downwardly and centrally beneath the opening in the cover of the base-casing, the bottom of said supplemental casing being also directed upwardly and centrally thereof and said bottom being also provided with radial passages whereby the water from the main casing is free to circulate beneath the supplemental casing and rise therein, substantially as shown and described.

In testimony that I claim the foregoing as my invention I have signed my name, in presence of the subscribing witnesses, this 22d day of March, 1902.

ALONZO N. ROSE.

Witnesses:
F. A. STEWART,
F. F. TELLER.